(12) United States Patent
Strom et al.

(10) Patent No.: US 9,046,396 B2
(45) Date of Patent: *Jun. 2, 2015

(54) PROCESS VARIABLE MEASUREMENT USING UNIVERSAL FLOW TECHNOLOGY CONNECTION PLATFORM

(71) Applicant: Dieterich Standard, Inc., Boulder, CO (US)

(72) Inventors: Gregory Robert Strom, Boulder, CO (US); Paul Timothy Deegan, Denver, CO (US); Oluwadamilola Peter Dipo-Ajayi, Burnsville, MN (US); Alan Kempner, Boulder, CO (US)

(73) Assignee: Dieterich Standard, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,916

(22) Filed: Dec. 24, 2013

(65) Prior Publication Data

US 2014/0260657 A1 Sep. 18, 2014

Related U.S. Application Data

(63) Continuation-in-part of application No. 13/836,263, filed on Mar. 15, 2013.

(51) Int. Cl.
*G01F 1/00* (2006.01)
*G01F 1/34* (2006.01)
(Continued)

(52) U.S. Cl.
CPC ... *G01F 1/34* (2013.01); *G01F 1/32* (2013.01); *G01F 1/58* (2013.01); *G01F 1/66* (2013.01);
(Continued)

(58) Field of Classification Search
CPC ............ G01F 1/50; G01F 15/04; G01F 1/42; G01F 1/36; G01F 1/00
USPC .................................. 73/861.61, 861.01, 861
See application file for complete search history.

(56) References Cited

U.S. PATENT DOCUMENTS

| 2,050,544 A | 8/1936 | Robinson et al. |
| 2,585,290 A | 2/1952 | Walker |

(Continued)

FOREIGN PATENT DOCUMENTS

| DE | 10 2007 034 158 | 1/2009 |
| JP | 59054864 | 3/1984 |

(Continued)

OTHER PUBLICATIONS

U.S. Appl. No. 13/836,263, filed Mar. 15, 2013, Gregory Storm.*

(Continued)

*Primary Examiner* — Jewel V Thompson
(74) *Attorney, Agent, or Firm* — Westman, Champlin & Koehler, P.A.

(57) ABSTRACT

An apparatus for measuring flow of a process fluid includes an elongate spool providing a spool conduit therethrough adapted to be coupled in line with process piping to receive the flow of process fluid. A meter body is carried by the elongate spool and receives the spool conduit therethrough. The meter body includes a flow measurement component opening which extends from the spool conduit to outside of the meter body. A flow component is configured for placement in the flow measurement component opening of the meter body. A carrier is configured to removably mount to the meter body and couple the flow measurement component to the spool conduit through the flow measurement component opening. A flow measurement transmitter couples to the flow measurement component to measure the flow of process fluid based upon an interaction between the process fluid and the flow measurement component.

38 Claims, 14 Drawing Sheets

(51) Int. Cl.
*G01F 15/18* (2006.01)
*G01F 1/42* (2006.01)
*G01F 15/06* (2006.01)
*G01F 15/14* (2006.01)
G01F 1/32 (2006.01)
G01F 1/58 (2006.01)
G01F 1/66 (2006.01)
G01F 1/44 (2006.01)
G01F 1/84 (2006.01)

(52) U.S. Cl.
CPC *G01F 15/18* (2013.01); *G01F 1/42* (2013.01); *G01F 1/44* (2013.01); *G01F 1/8468* (2013.01); *G01F 15/063* (2013.01); *G01F 15/14* (2013.01)

(56) References Cited

U.S. PATENT DOCUMENTS

| | | | |
|---|---|---|---|
| 3,822,592 A | 7/1974 | Siegel et al. |
| 4,370,893 A | 2/1983 | Combes |
| 4,422,339 A | 12/1983 | Gall et al. |
| 4,503,594 A | 3/1985 | Gall et al. |
| 4,989,456 A | 2/1991 | Stupecky |
| 5,069,252 A | 12/1991 | Kendrick et al. |
| 5,186,474 A | 2/1993 | Jacobs |
| 5,305,796 A | 4/1994 | Klak |
| 5,463,904 A | 11/1995 | Kalinoski |
| 5,617,899 A | 4/1997 | Linton et al. |
| 5,655,571 A | 8/1997 | Gawlik |
| 5,836,356 A | 11/1998 | Desai |
| 6,543,297 B1 | 4/2003 | Kleven |
| 8,215,340 B2 | 7/2012 | Loga et al. |
| 2011/0079090 A1 | 4/2011 | Kroemer et al. |

FOREIGN PATENT DOCUMENTS

| WO | WO 02/063250 | 8/2002 |
|---|---|---|
| WO | 2009108500 A2 | 9/2009 |

OTHER PUBLICATIONS

U.S. Appl. No. 13/836,263, filed Mar. 15, 2013, 21 pages.
International Search Report and Written Opinion for PCT Application No. PCT/US2009/033767 filed Feb. 11, 2009, dated Aug. 31, 2009, 6 pages.
Daniel Orifice Fittings Brochure, Emerson Process Management, 9 pages.
Notification of Transmittal of the International Search Report and the Written Opinion of the International Searching Authority, or the Declaration, from PCT/US2014/021600, dated Jul. 14, 2014.
Notification of Transmittal of the International Search Report and the Written Opinion of the International Searching Authority, or the Declaration, from PCT/US2014/021597, dated Jul. 14, 2014.

* cited by examiner

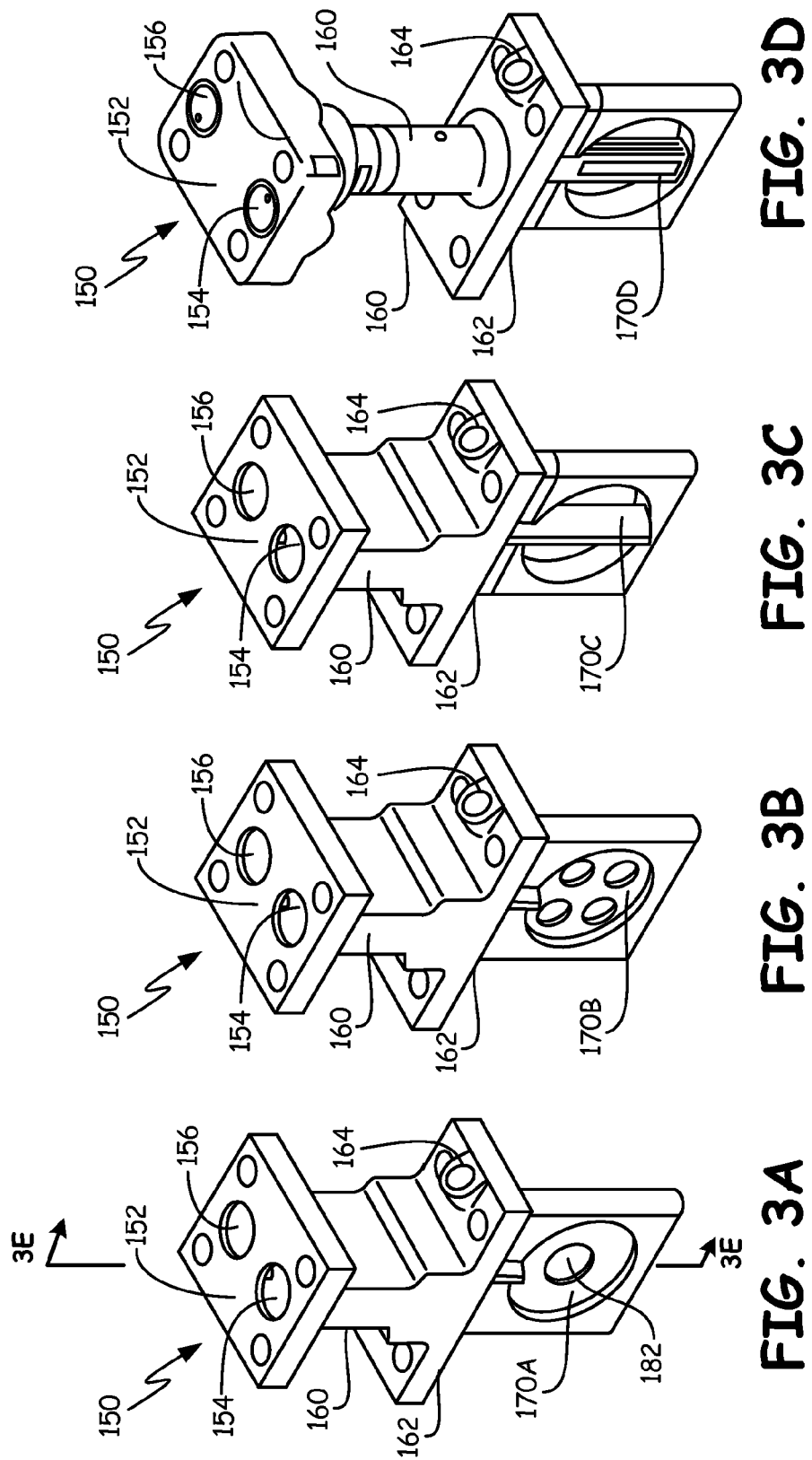

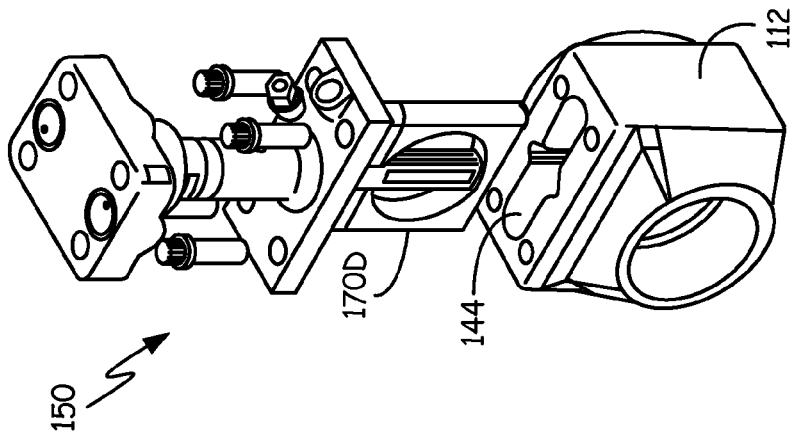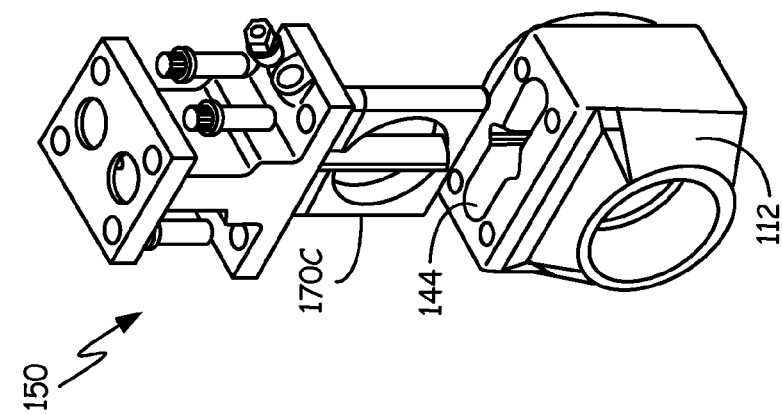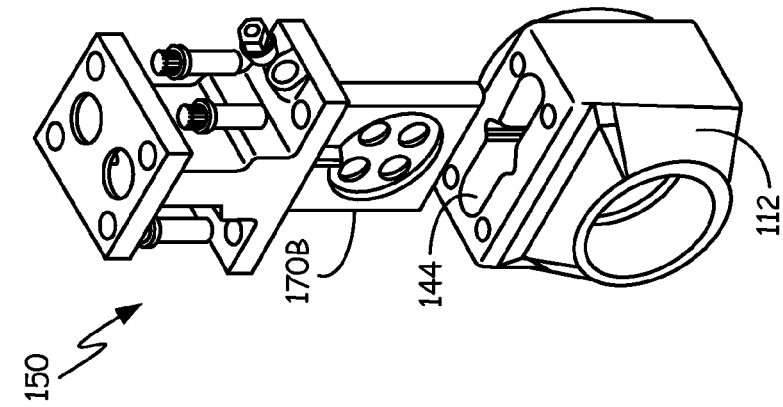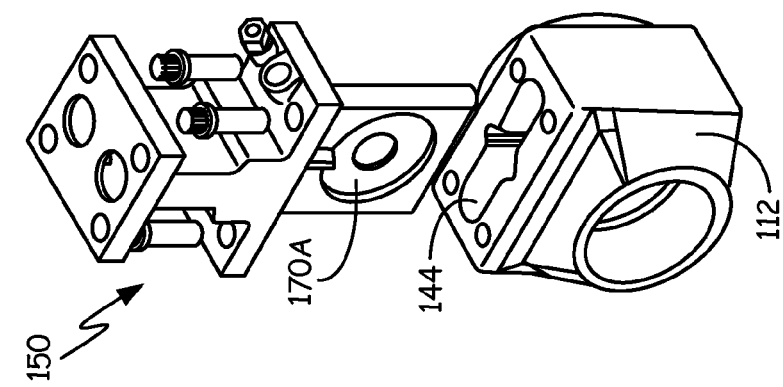

PROCESS VARIABLE MEASUREMENT USING UNIVERSAL FLOW TECHNOLOGY CONNECTION PLATFORM

CROSS-REFERENCE SECTION TO RELATED APPLICATIONS

The present application is a continuation in part of and claims priority of U.S. patent application Ser. No. 13/836,263, filed Mar. 15, 2013, the content of which is hereby incorporated by reference in its entirety.

BACKGROUND

The present invention relates to measurement of a process variable in an industrial process. More specifically, the present invention relates to measurement of such a process variable using a flow measurement component placed in the process piping.

Industrial processes are used in the production of many types of process fluids. Examples include oil refineries, paper pulp manufacturing, chemical manufacturing, etc. In an industrial process, it is necessary to monitor operation of the process in order to accurately control the process. For example, "process variables" such as flow rate, temperature, pressure, level, etc. of the process can be monitored by process variable transmitters and used to provide the information to another location such as a central control room. In many instances, there are a number of different technologies or configurations of a process variable transmitter which can be used to measure a process variable. The particular technology and configuration can be selected based upon design constraints, desired accuracy, budgetary concerns, or other criteria.

Various technologies are known for measuring flow of a process fluid in an industrial process. Examples include differential pressure, magnetic, coriolis, vortex, and thermal mass based flow sensors.

The particular installation of a flow measurement system typically may require significant customization based upon the selected technology, the configuration of the process piping, the fluid being monitored, the diameter of the piping, the expected flow rates, as well other considerations. This customization is expensive and increases the amount of time and expertise required to install a process variable transmitter and ensure that it is providing accurate measurements. Further, the customization is often performed while the plant which implements the process is being constructed. For example, during manufacture of a plant, it may be known that a particular process variable measurement must be obtained at a particular location, however, it may not be readily apparent what technology should be used to obtain the process variable, or even if measurement of the process variable is necessary. This can introduce delays in the construction of a new facility as well as increase costs.

SUMMARY

An apparatus for measuring flow of a process fluid includes an elongate spool providing a spool conduit therethrough adapted to be coupled in line with process piping to receive the flow of process fluid. A meter body is carried by the elongate spool and receives the spool conduit therethrough. The meter body includes a flow measurement component opening which extends from the spool conduit to outside of the meter body. A flow component is configured for placement in the flow measurement component opening of the meter body. A carrier is configured to removably mount to the meter body and couple the flow measurement component to the spool conduit through the flow measurement component opening. A flow measurement transmitter couples to the flow measurement component to measure the flow of process fluid based upon an interaction between the process fluid and the flow measurement component.

BRIEF DESCRIPTION OF THE DRAWINGS

FIGS. 3A, 3B, 3C, and 3D are perspective views of a flow measurement component carrier and illustrate example flow measurement component configurations.

FIGS. 4A, 4B, 4C, and 4D show the flow measurement component of FIGS. 3A-D, respectively, proximate a meter body.

DETAILED DESCRIPTION OF ILLUSTRATIVE EMBODIMENTS

Figure 1:
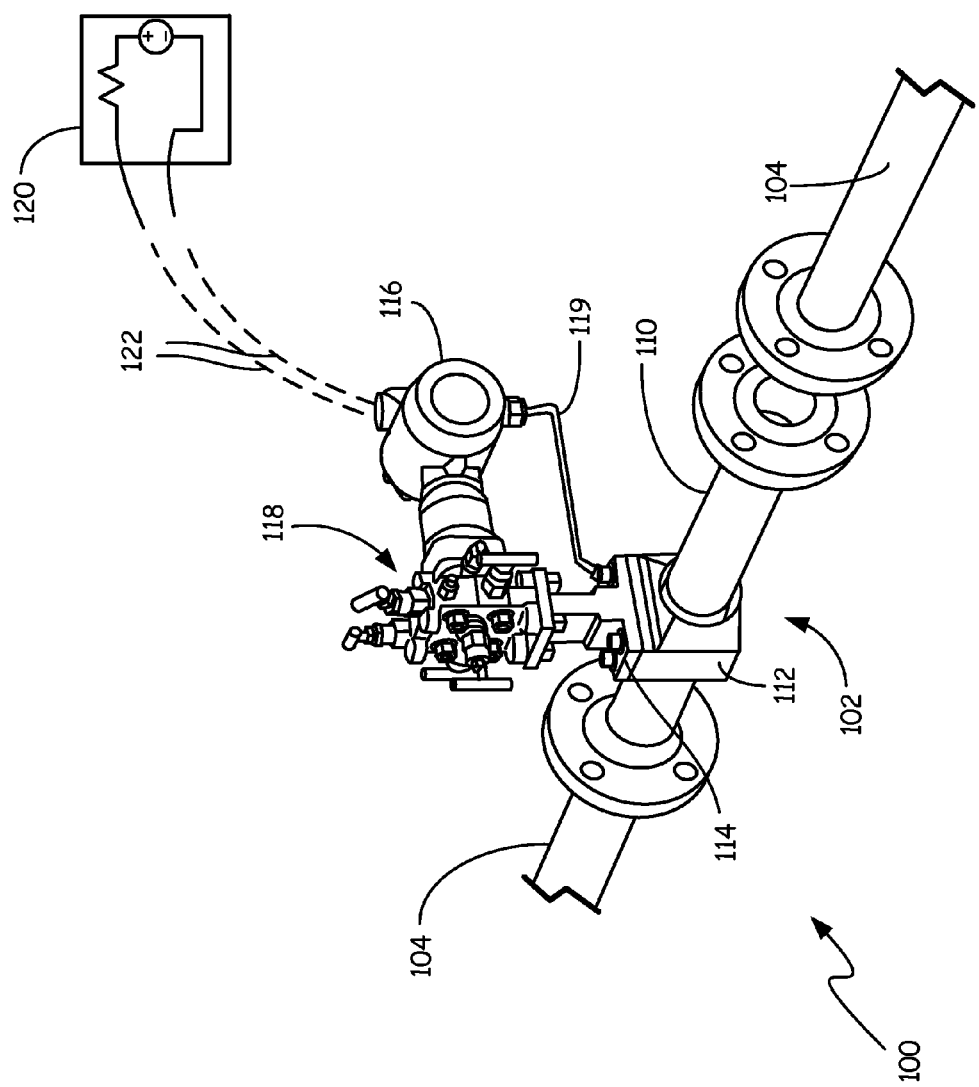
FIG. 1 is a diagram showing an apparatus for measuring flow a process fluid based upon a differential pressure in accordance with one embodiment of the present invention.

As discussed in the Background section, various technologies are known for measuring process variables such as flow in an industrious process. During construction of a plant, it may be apparent that measurement of a process variable at a certain location within the process may be desirable. However, at such an early stage of development, it may not be clear exactly what technology would be preferred. Further still, once a technology is selected, it must be properly installed and calibrated or configured based upon the process environment. This customization increases the time and expertise required to construct a new plant, increases overall costs as well increases front end costs. The present invention provides a new flow measurement platform, along with a new distribution and installation method in which a standardized (or universal) platform may be installed at a location in a process which is capable of supporting different types of process variable measurement technologies. The platform consists of a spool conduit with a meter body configured to receive a flow measurement component carrier. The installation platform can be configured to operate without any process variable measurement technology if desired. This allows the optional updating of a process variable transmitter, including the addition of a process variable transmitter at a location in which one was not previously present, as well as changing a process variable technology from one measurement technology to another. This platform reduces the amount of customization which must be performed during the initial construction of a plant and allows greater flexibility to change technologies.

One specific process variable measurement technology used for measuring flow is based upon differential pressure which can be used to determine flow rate of a process fluid through process piping. Although differential pressure based flow measurement is described below in detail, the invention is not limited to this technology. When measuring flow with a differential pressure, the pressure drop can be generated using a number of different technologies which can be selected for a particular application. The differential pressure generating element is referred to as a "flow measurement component." One disadvantage of differential pressure based flow measurements is that the systems may require a great deal of customization for a given application. For example, the application may need to be customized based upon the diameter of the pipe being used, the wall thickness of the pipe, the temperature and pressure ranges of the process fluid, expected flow ranges, properties of the process fluid being measured, among others. All of these variables must be determined for each location within the industrial process at which a differential pressure based flow measurement is to be taken. This can be time consuming and further requires customization of each of the flow measurement devices within the industrial process. Further, in order to obtain accurate flow measurements using differential pressure, the flow profile of the process fluid should be fully developed. However, the configuration of the adjacent piping (such as elbows, tees, valves, constrictions, expansions, filters, etc.) can disturb the flow profile thereby resulting in a measurement error.

A universal flow measurement platform is provided which uses standardized components that can be selected for a particular application and measurement technology. A meter body is carried by a spool. The meter body is configured to receive a flow measurement component which is supported and secured by a carrier. A flow measurement transmitter couples to the carrier and measures a process variable signal. This signal is then used to determine flow rate.

FIG. 1 is a diagram showing a portion of an industrial process 100 including a flow measuring apparatus 102 in accordance with one embodiment. Flow measuring apparatus 102 couples to process piping 104 and is configured to measure flow of a process fluid through piping 104 as discussed below in more detail. Flow measuring apparatus 102 includes a spool section 110 which carries a meter body 112. Spool section 110 may be an elongate spool as illustrated, or, may be a section which is integral with meter body 112. A carrier 114 couples to the meter body 112 and supports a flow measurement component which in this embodiment, comprises a flow measurement component (not shown in FIG. 1) and a differential pressure transmitter 116. The process variable transmitter 116 could couple couples to the carrier 114 through a manifold connection 118. Typically, transmitter 116 is attached to the flange 118 through bolts or other means to secure the two together. Similarly, flange 118 can be bolted to carrier 114, which in turn is bolted to meter body 112. Spool section 110 is attached to piping 104 through, for example, bolts. However, any appropriate attachment technique may be employed including welds. Typically some type of seal may be included between the transmitter 116, flange 118, carrier 114 and meter body 112. Similarly, seals can be positioned between spool 110 and process piping 104. Although bolts are described herein, any appropriate attachment technique may be employed. The meter body 112 and spool 110 can be formed as a continuous piece, or can be formed separately and welded together or otherwise coupled together. The transmitter 116 in FIG. 1 also includes an additional process variable connection 119 to the carrier 114. For example, this can be used to connect the transmitter 116 to a temperature sensor. The differential pressure transmitter 116 determines flow of the process fluid based upon a differential pressure generated by the flow measurement component. Pressure transmitter 116 couples to, for example, a control room 120 through a two-wire process control loop 122. The control room 120 is modeled as a resistance in series with a power supply. In one configuration, the process control loop 122 is a two-wire process control loop. In such a configuration, the control loop 122 can carry both information as well as power used to power transmitter 116. For example, in accordance with one embodiment, a current carried on the loop is controlled by the flow measurement device 116 and is representative of the measured flow. The same current is also used to power circuitry within transmitter 116. In another example embodiment, a digital communication signal can be superimposed on this current to provide additional communication. One such protocol is the HART® communication protocol. Example process control loops include 4-20 mA loops, or loops in accordance with the HART®, Profibus or Fieldbus standards. One example of a wireless communication technique is in accordance with the WirelessHART® communication protocol (IEC 62591). Standard Ethernet, fiberoptic connection, or other communication channels may also be used.

Figure 2:
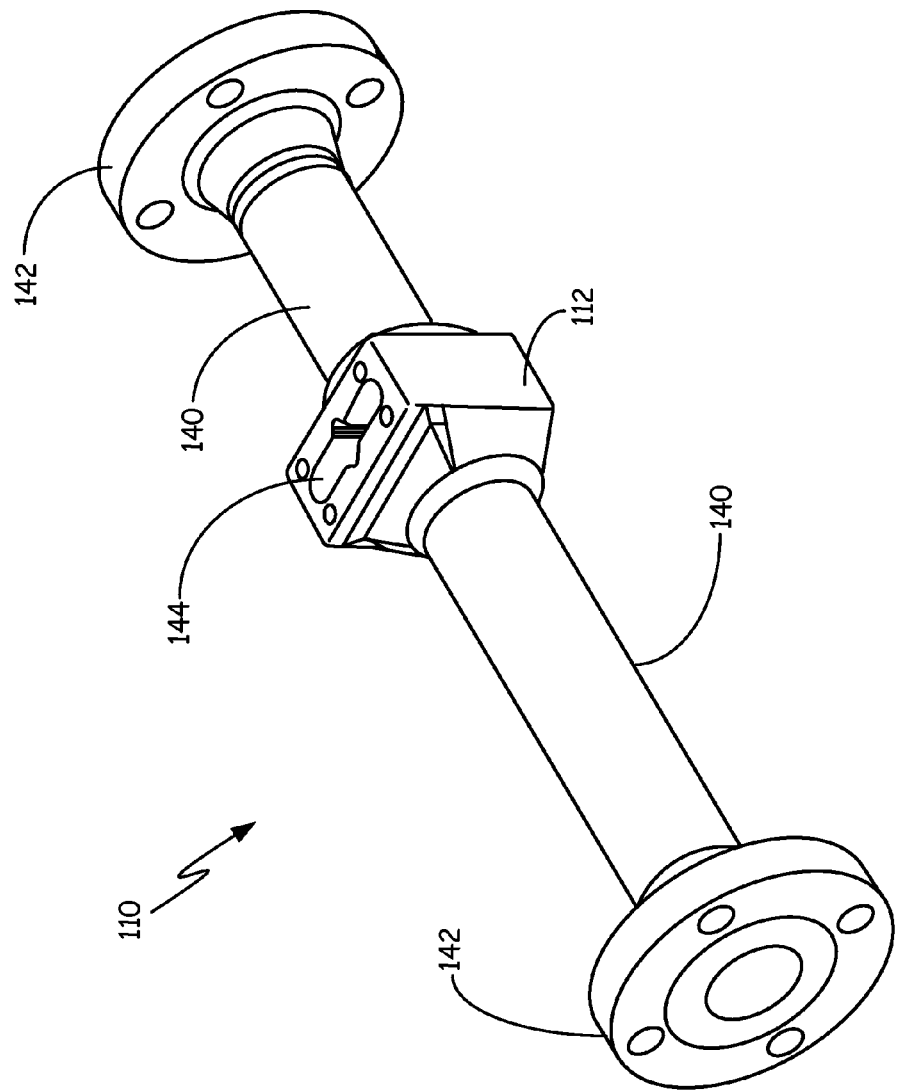
FIG. 2 is a perspective view of a spool section shown in FIG. 1.

FIG. 2 is a perspective view of spool section 110 shown in FIG. 1. Spool section 110 includes an elongate spool conduit 140 which couples to flanges 142. Flanges 142 are used to couple the spool section 110 to process piping whereby spool conduit 140 receives the flow of process fluid therethrough. The spool conduit 140 extends through meter body 112 which includes a flow measurement component opening 144 explained herein in more detail. flow measurement component opening 144 extends from outside of the meter body 112 to within the spool conduit 140. In the example embodiment illustrated in FIG. 2, the spool conduit 140 is a straight conduit.

FIGS. 3A, 3B, 3C and 3D are perspective views of a flow measurement component carrier 150. The flow measurement component carrier 150 includes a transmitter or manifold mounting face 152 having pressure ports 154 and 156 formed therein. The mounting face is preferably supported on a riser section 160 and couples to a meter body mounting face 162. The meter body mounting face 162 is configured to be sealably coupled to meter body 112 shown in FIG. 1. FIGS. 3A-D show various examples of a flow measurement component 170A-D which is inserted through flow measurement component opening 144 shown in FIG. 2 and configured to receive a flow of process fluid through spool conduit 140 also shown in FIG. 2.

In FIG. 3A, a flow measurement component 170A is illustrated as an orifice plate. The orifice plate 170A is illustrated as a plate having an opening therethrough which has a diameter which is less than the diameter of the spool conduit 140. In FIG. 3B, a flow measurement component 170B is illustrated as a conditioning orifice plate consisting of four smaller openings. FIG. 3C shows an example embodiment of an averaging pitot tube type flow measurement component 170C. The flow measurement component 170C is well-suited for severe environments in which debris may damage components of the device. A pitot tube type flow measurement component consists of an elongate tube which extends into the flow of the process fluid and has an at least one opening proximate an upstream side of the pitot tube and a at least one other opening proximate a downstream side of the pitot tube. The differential pressure is generated between these two openings. FIG. 3D illustrates another example embodiment of an averaging pitot tube type flow measurement component 170D. In FIG. 3D, the pitot tube is configured as an Annubar® averaging pitot tube which is available from Rosemount Inc. Also illustrated in the embodiments shown in FIGS. 3A-D is secondary connection 164 on meter body mounting face 162. Secondary connection 164 can, for example, comprise an opening which extends close to the process fluid allowing additional process variables to be collected such as process fluid temperature. As illustrated in FIG. 1, process variable connection 119 can couple to secondary connector 164. Although the flow measurement component illustrated in FIGS. 3A-D are shown as a single piece with the flow measurement component carrier 150, in one embodiment these can be two separate pieces whereby a desired flow measurement component 170 can be attached to the carrier 150. The attachment can be through known techniques used to mount flow measurement component, for example, bolting an orifice plate onto the carrier and including a seal therebetween.

Figure 3E:
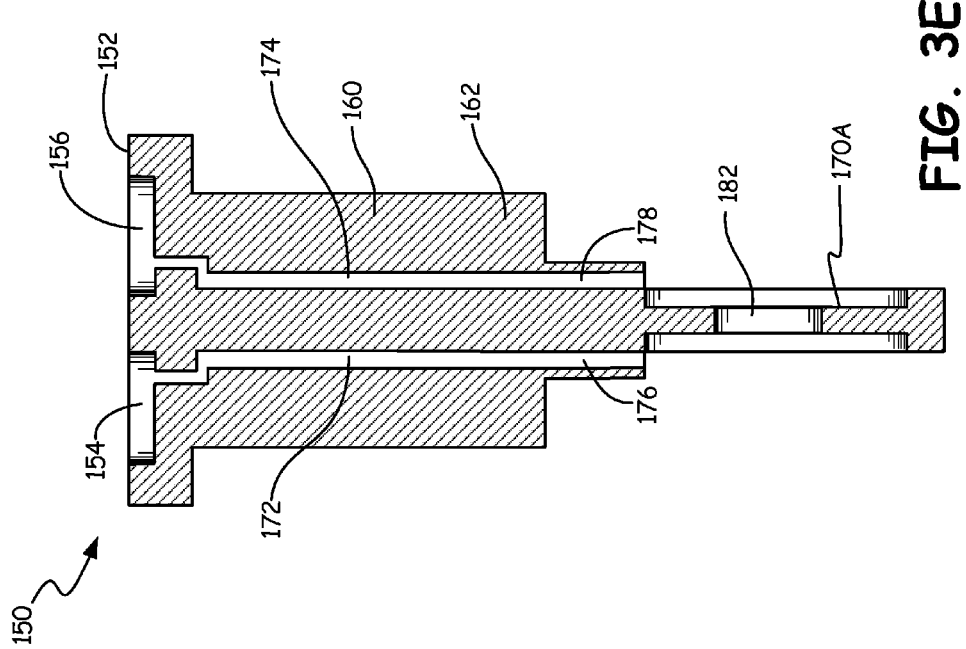
FIG. 3E is a side cross-sectional view of the flow measurement component carrier of FIG. 3A.

FIG. 3E is a cross-sectional view of flow measurement component carrier 150. In this example, a cross-sectional view of FIG. 3A is shown which includes orifice plate flow measurement component 170A. FIG. 3E illustrates internal passageways 172 and 174 which extend from process openings 176, 178 to pressure ports 154, 156, respectively, on mounting face 152. FIG. 3E also illustrates orifice plate opening 182. One of the ports 176, 178 is positioned on an upstream side of flow measurement component 170A and the other port 176, 178 is positioned on a downstream side. Thus, upstream and downstream pressures are coupled via passageways 172, 174 to pressure ports 154, 156. These pressures are then conveyed to transmitter 116 preferably through manifold connection 118 shown in FIG. 1.

FIGS. 4A, 4B, 4C, and 4D are perspective views of flow measurement component carrier 150 positioned adjacent meter body 112. As illustrated in FIGS. 4A-D, the flow measurement components 170A-D are configured to be received in flow measurement component opening 144. In one configuration, the flow measurement component opening 144 and flow measurement components 140A-D are arranged so that the two pieces can only be mounted together with the flow measurement component pointed in one direction. This can be used to ensure that the appropriate upstream and downstream pressure ports are properly coupled to the process variable transmitter. Although not shown in FIGS. 4A-D, typically a seal is placed between the faces of the meter body 112 and the carrier 150 whereby the carrier 150 is secured with the bolts as shown to the meter body 112. However, any attachment technique may be employed.

Figure 5B:
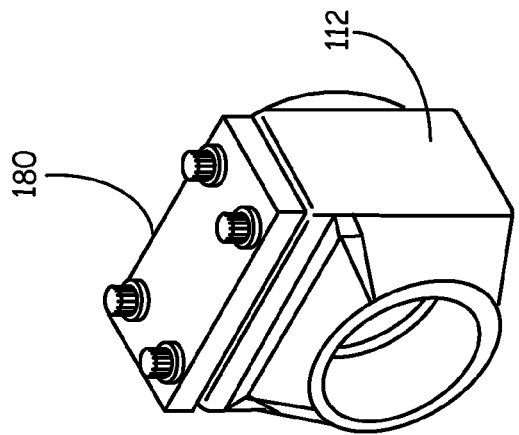
FIGS. 5A and 5B are perspective views of a sealing plate and meter body.
Figure 5A:
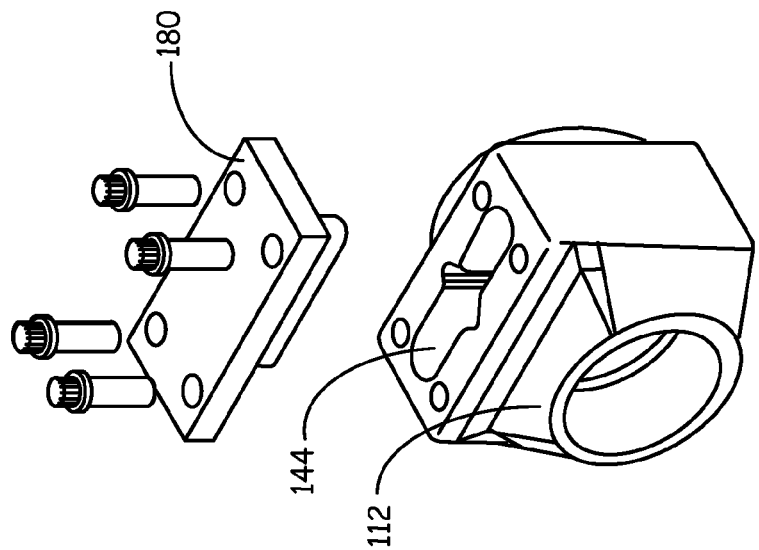

FIGS. 5A and 5B illustrate a sealing plate 180 mounted to meter body 112. The sealing plate 180 can be mounted using bolts or other connectors and can be sealed to meter body 112 during transportation or initial installation, for example. Additionally, the mounting plate 180 can be used if it is desired to remove a flow measurement component carrier 150 and allow the process to continue to operate.

Figure 6:
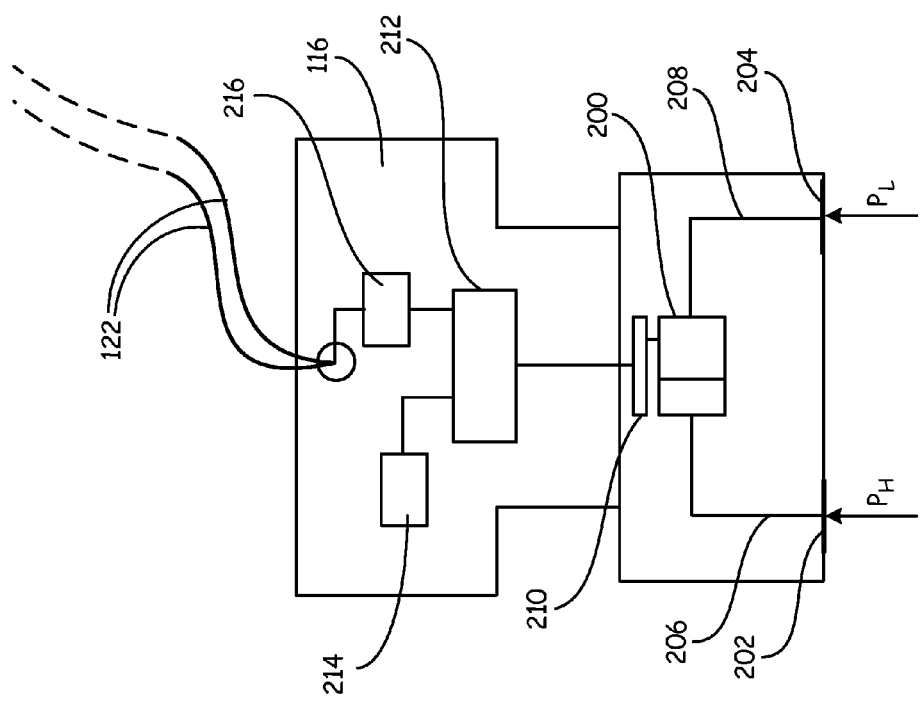
FIG. 6 is a simplified diagram of a flow transmitter.

FIG. 6 is a simplified diagram of one example configuration of flow measurement transmitter 116. FIG. 6 is provided to illustrate one type of flow measurement technology based on differential pressure. However, any flow measurement technology may be implemented. In FIG. 6, high and low pressures $P_H$ and $P_L$, respectively, are applied to a differential pressure sensor 200. The pressures $P_H$ and $P_L$ can be coupled to differential pressure sensor 200 using an isolating configuration in which isolation diaphragms 202 and 204 separate the process fluid from an isolation fluid carried in capillary tubes 206 and 208, respectively. Based upon the applied differential pressure, the pressure sensor 200 provides a pressure sensor output to sensor circuitry 210. The sensor circuitry 210 can perform compensation or other actions on the sensor signal and provide a signal to measurement circuitry 212. Measurement circuitry 212 can comprise, for example, a microprocessor system operating in accordance with instructions stored in a memory 214. Input/output circuitry 216 couples to measurement circuitry 212 and can be used to provide a transmitter output. For example, this output can be formatted on two-wire process control loop 122. Loop 122 may be in accordance with any communication technique including wireless techniques. In one configuration, circuitry 216 also receives power from loop 122 and is used to provide power to other circuits within transmitter 116. The present invention is not limited to the particular pressure sensing and measurement techniques discussed herein.

Figure 7:
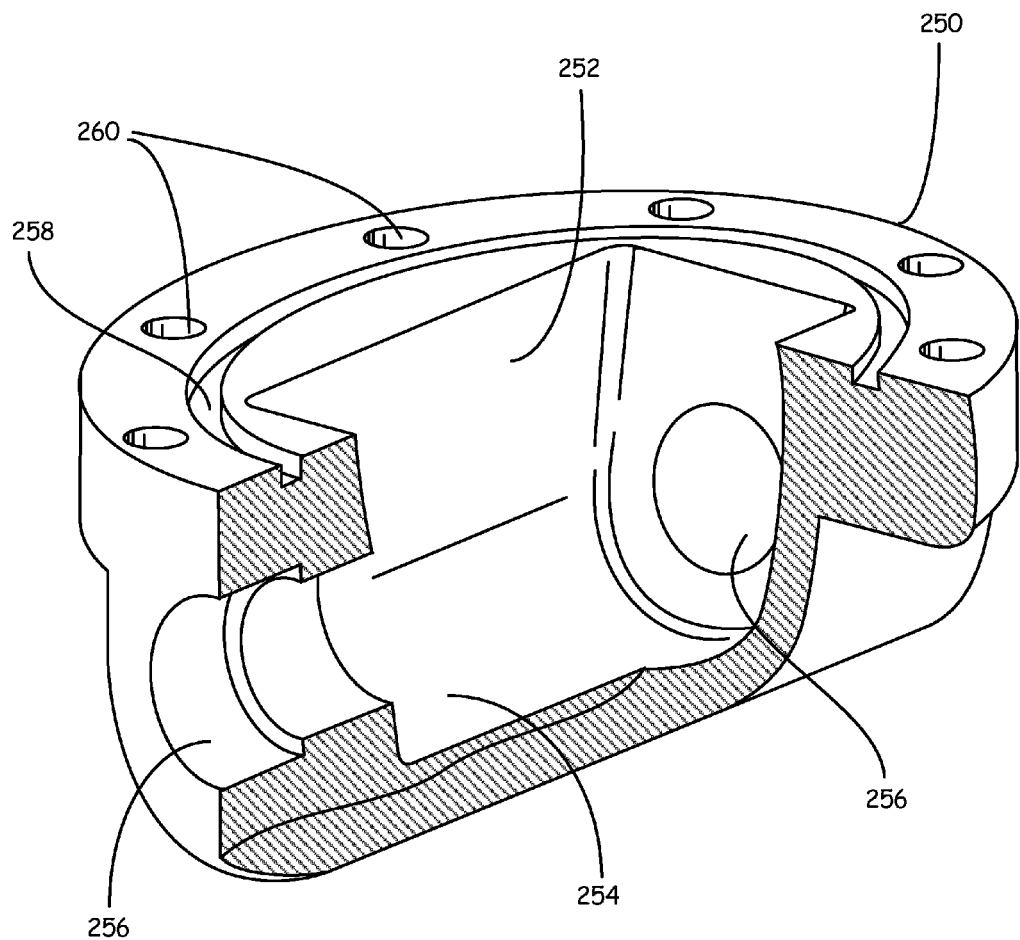
FIG. 7 is a cut away perspective view of a meter body configured to receive different types of flow measurement component which can incorporate multiple different process variable measurement technologies.

FIG. 7 is a perspective partial cut away view of a meter body 250 which is configured to receive carriers based upon various measurement technologies. Meter body 250 includes spool conduit 256 and provides a flow measurement component cavity accessible through a meter body (a gasket 282 is configured to fit into gasket depression 258 and provide a seal between carrier 272 and meter body 250) opening 252. A gasket depression 258 extends around opening 252 and is ringed by bolt holes 260. Meter body 250 of FIG. 7 is configured to receive carriers based upon a number of different technologies. Example flow measurement technologies include magnetic, vortex, coriolis, ultrasonic, thermal mass, wedge or venturi.

Figure 8:
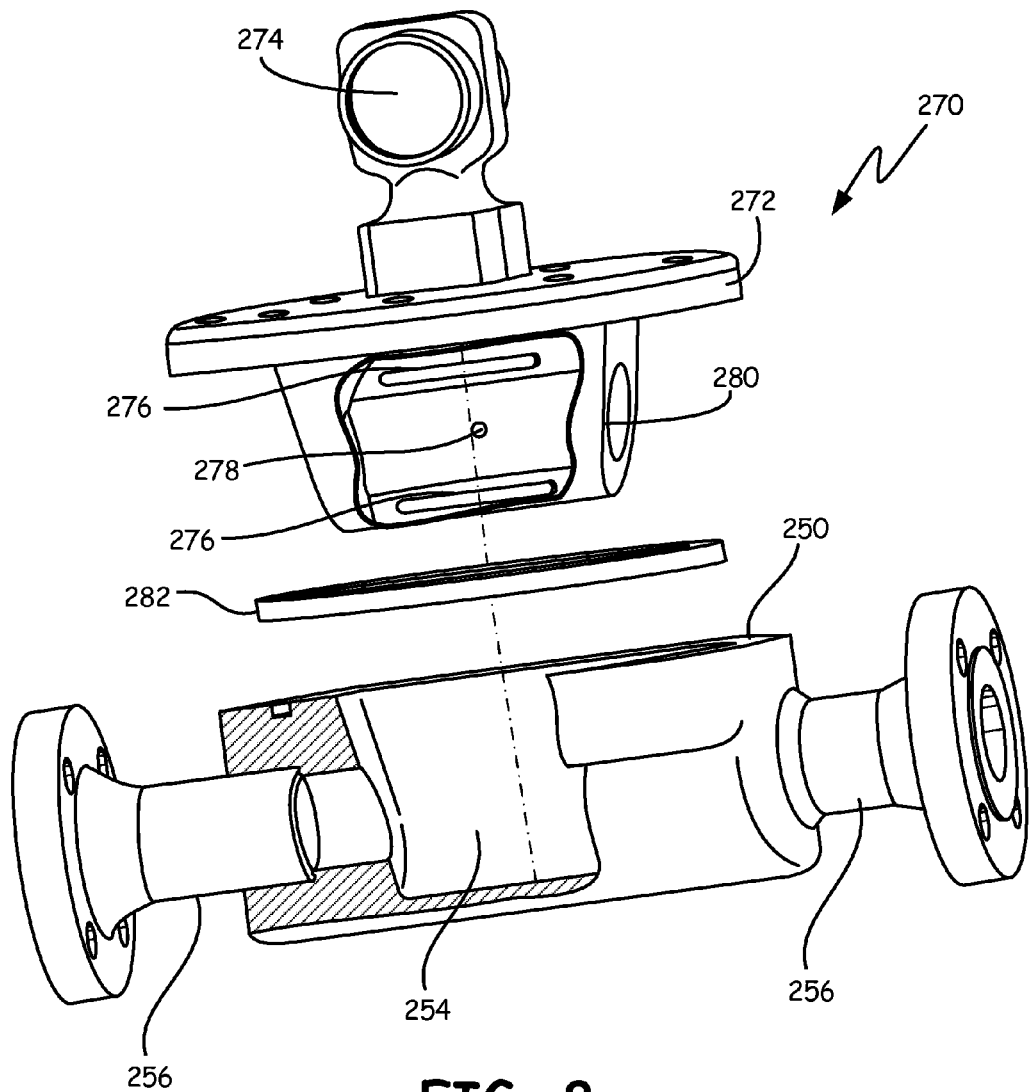
FIG. 8 is an exploded view showing the meter body and a magnetic flow tube flow measurement component.

FIG. 8 is a side exploded partial cross-sectional view of a magnetic flowmeter 270 utilizing the meter body 250 shown in FIG. 7. Magnetic flowmeter 270 includes a carrier including a magnetic flow tube 272 coupled to an electronics housing 274. In the example embodiment of FIG. 8, the carrier 280 comprises a magnetic flow tube including at least one coil 276 configured to produce a magnetic field in fluid flowing through the carrier 280. Electrodes 278 are configured to sense a resultant voltage which is related to flow rate. The flow measurement component flow tube 280 is configured to fit into flow measurement component cavity 254 and align with spool conduit 256. Optional gaskets 282 or the like may be used to provide a seal between flow measurement component flow tube 280 and meter body 250.

Figure 9:
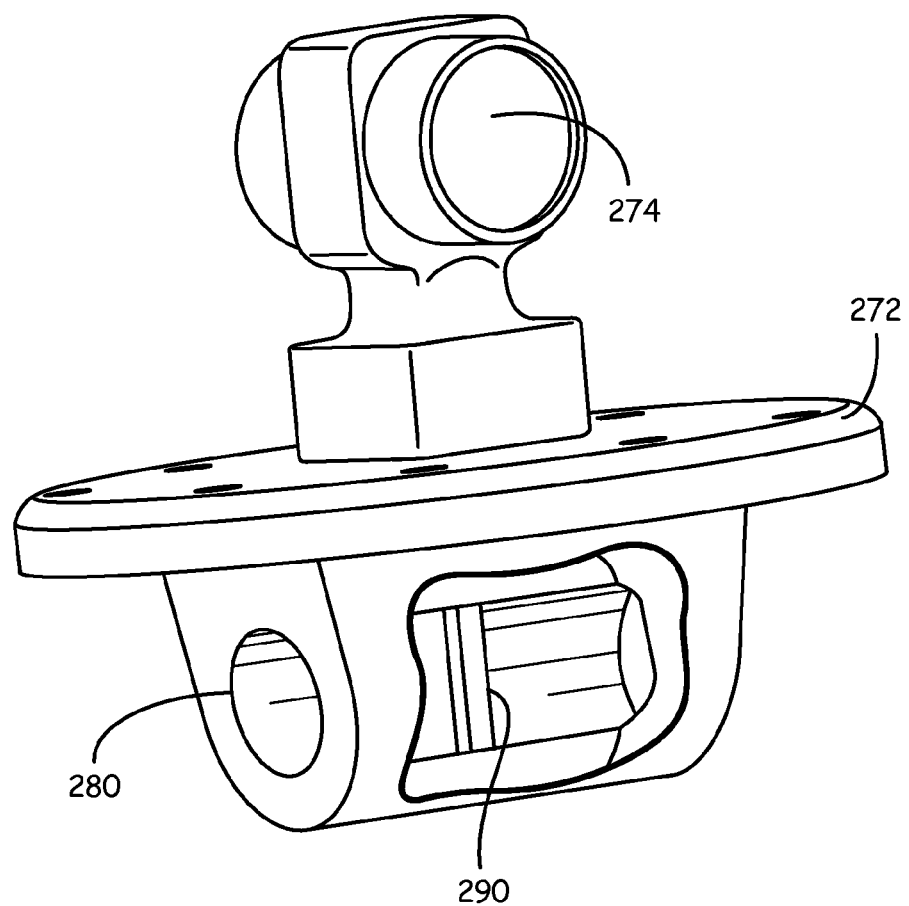
FIG. 9 is a partial cut away view showing a carrier configured with a vortex shedding bar flow measurement component.

FIG. 9 is a side partial cut away view of an embodiment of carrier 272 in which the flow tube 280 carries a vortex shedding bar 290. In accordance with known techniques, vortex shedding bar 290 vibrates at a frequency and amplitude related to the flow rate of process fluid flowing past the shedding bar 290. A sensor in transmitter 274 is configured to sense these vibrations and correlate them with flow rate.

Figure 10:
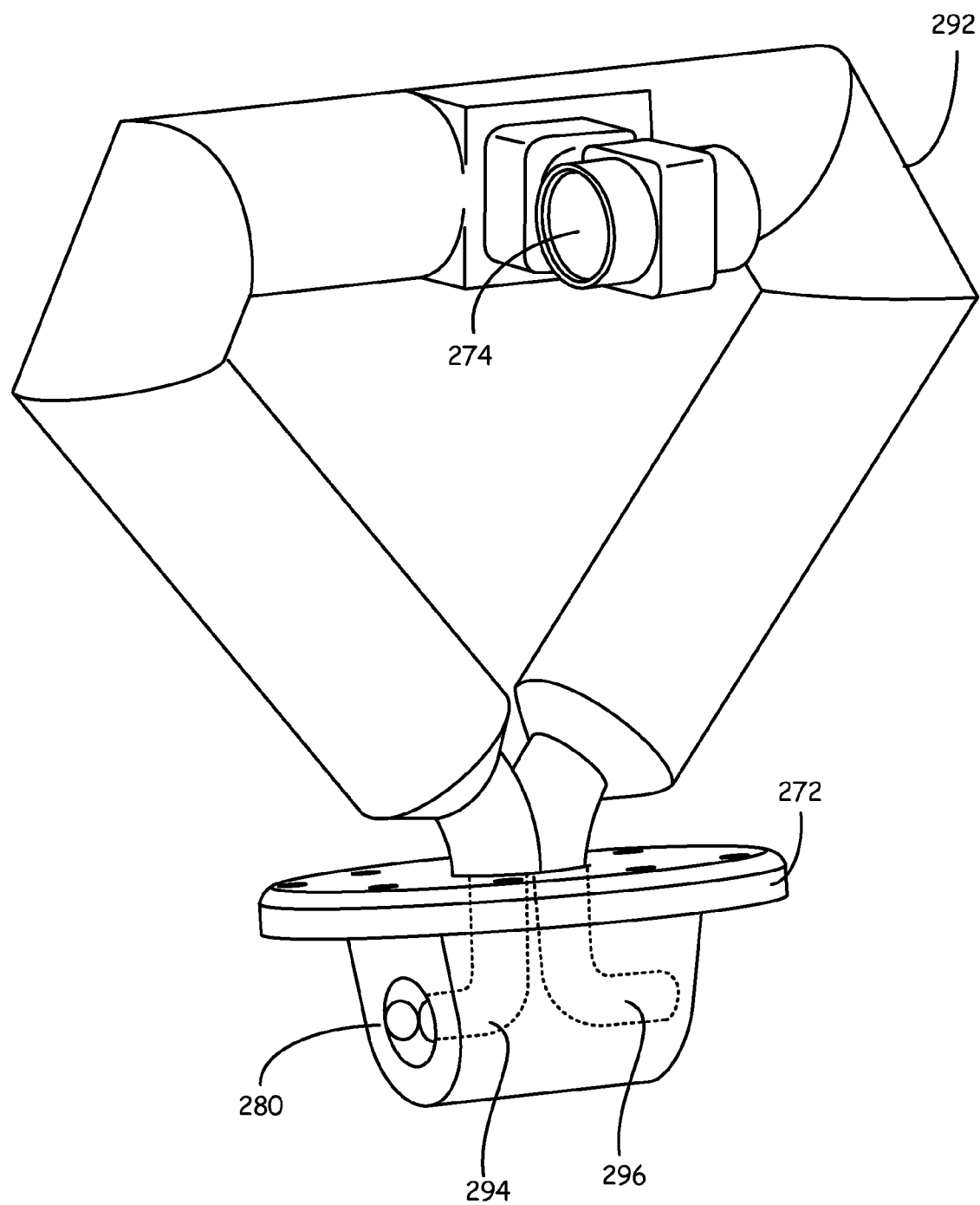
FIG. 10 is a perspective view showing a carrier including a coriolis flow measurement component.

FIG. 10 is another example embodiment and illustrates a configuration in which carrier 272 is arranged for use with a coriolis meter. In FIG. 10, flow tube 280 includes passageways 294 and 296 configured to route process fluid through tubes (not shown) carried in coriolis housing 292. In accordance with known techniques, these tubes are caused to move in tandem. Movement of the tubes can be monitored and correlated to flow rate of the process fluid using circuitry and transmitter 274.

Figure 11:
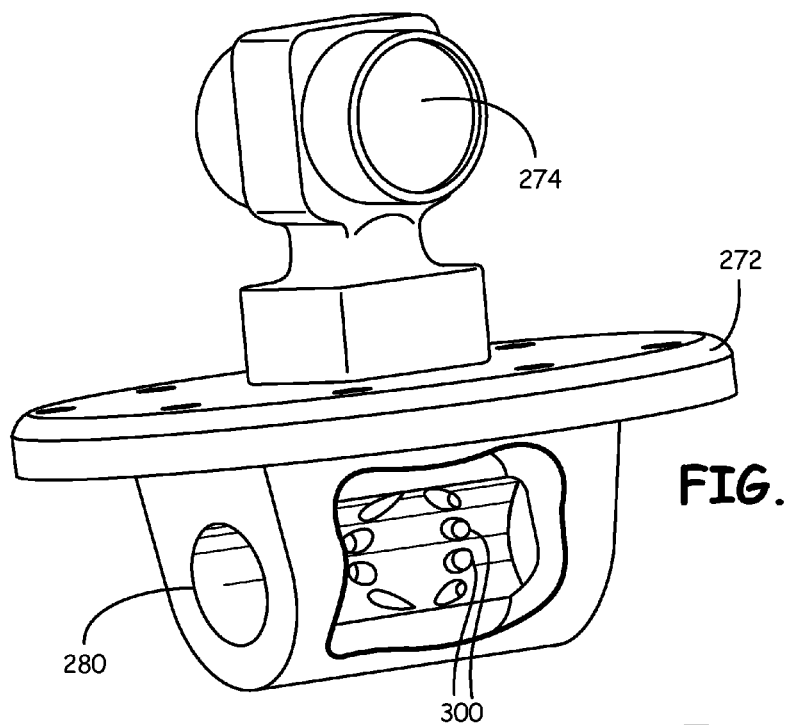
FIG. 11 is a perspective view showing the carrier with an ultrasonic flow measurement component.

FIG. 11 is a partial cut away view of another example embodiment in which carrier 272 is configured to carry ultrasonic transducers 300 in flow tube 280. In this configuration, transmitter 274 can measure flow rate using ultrasonic transducers 300. Such measurements can be based upon time or frequency characteristics of ultrasonic signals transmitted through process fluid. For example, a time delay or a frequency shift due to the Doppler Effect can be correlated with flow rate of the process fluid.

Figure 12:
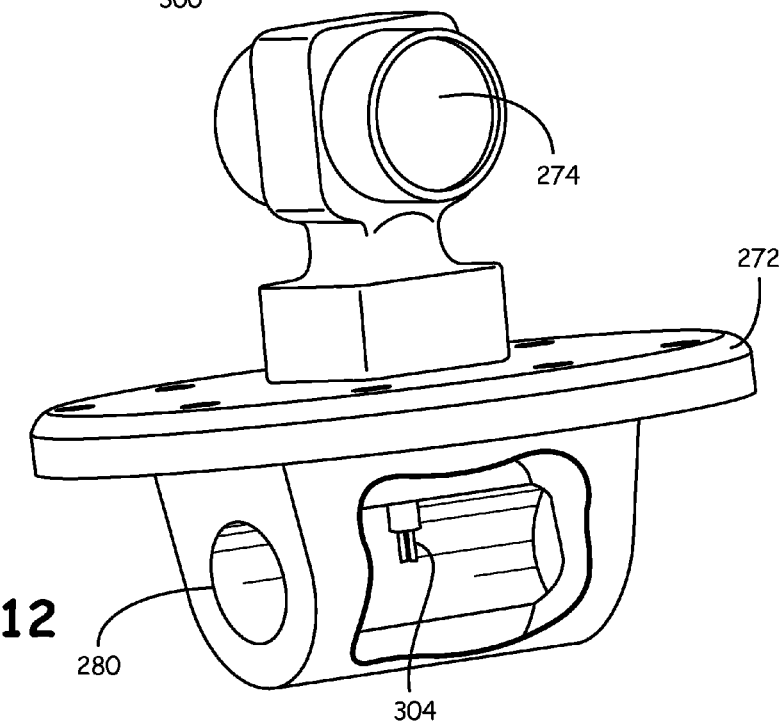
FIG. 12 is a perspective view showing the carrier with a thermal mass flow measurement component.

FIG. 12 is a partial cross-sectional view of another embodiment of carrier 272 in which the flow tube 280 carries a thermal mass sensor. Thermal mass sensors can be used to measure flow rates by monitoring temperature changes between a heated element and an unheated element due to thermal dispersion to the passing process fluid. An increasing change in the temperature difference between the two elements can be correlated to an increased flow of process fluid. In such a configuration, transmitter 274 is configured to control operation of the thermal mass sensor 304 and correlate its output to flow rate.

Figure 13:
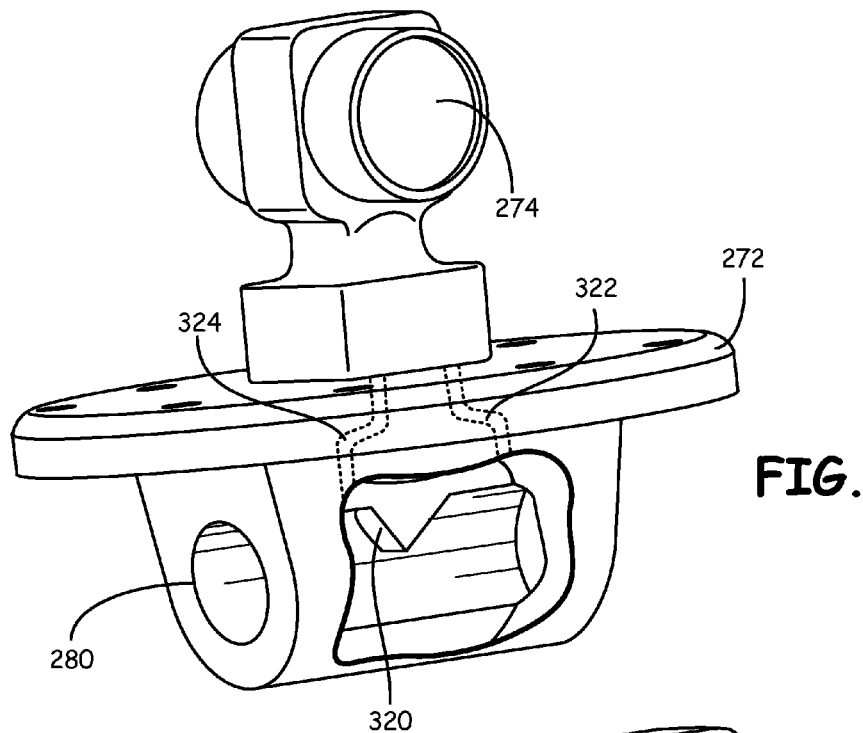
FIG. 13 is a perspective view showing the carrier with a wedge flow measurement component.

FIG. 13 is a partial cross-sectional view of carrier 272 illustrating another type of flow measurement component, a wedge 320, placed in flow tube 280. In such a configuration, passageways 322, 324 carry process pressures to a pressure sensor in the process variable transmitter 274. Similar to an orifice plate, the wedge 320 introduces a differential pressure in the flow of process fluid which can be correlated with flow.

Figure 14:
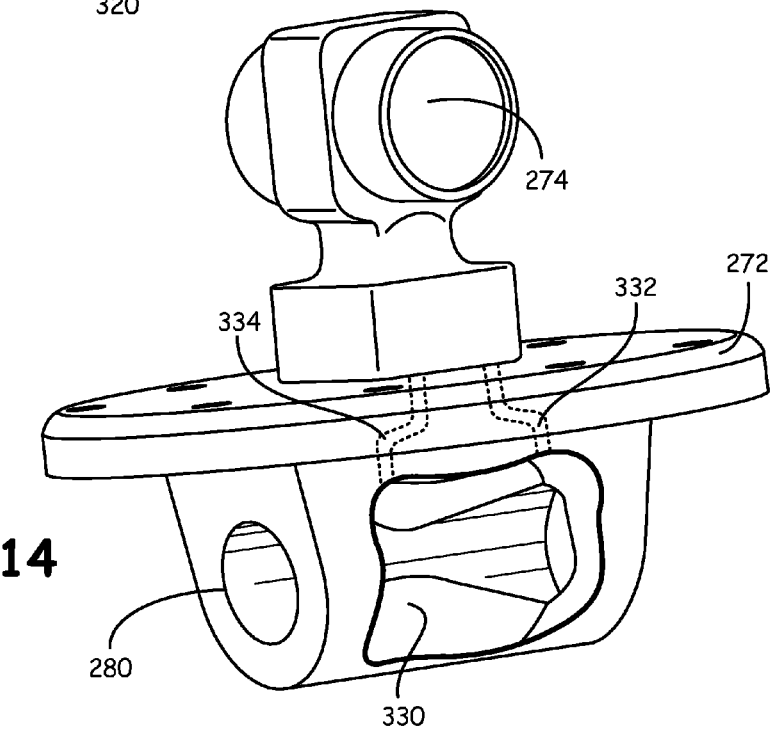
FIG. 14 is a perspective view showing the carrier with a venturi flow measurement component.

FIG. 14 shows another example of carrier 272 in which the flow measurement component is configured as a venturi tube 330. The venturi configuration creates a restriction in the flow of process fluid whereby a differential pressure may be sensed by a process variable coupled to passageways 332, 334. The differential pressure can be correlated with the flow rate of process fluid.

Figure 15:
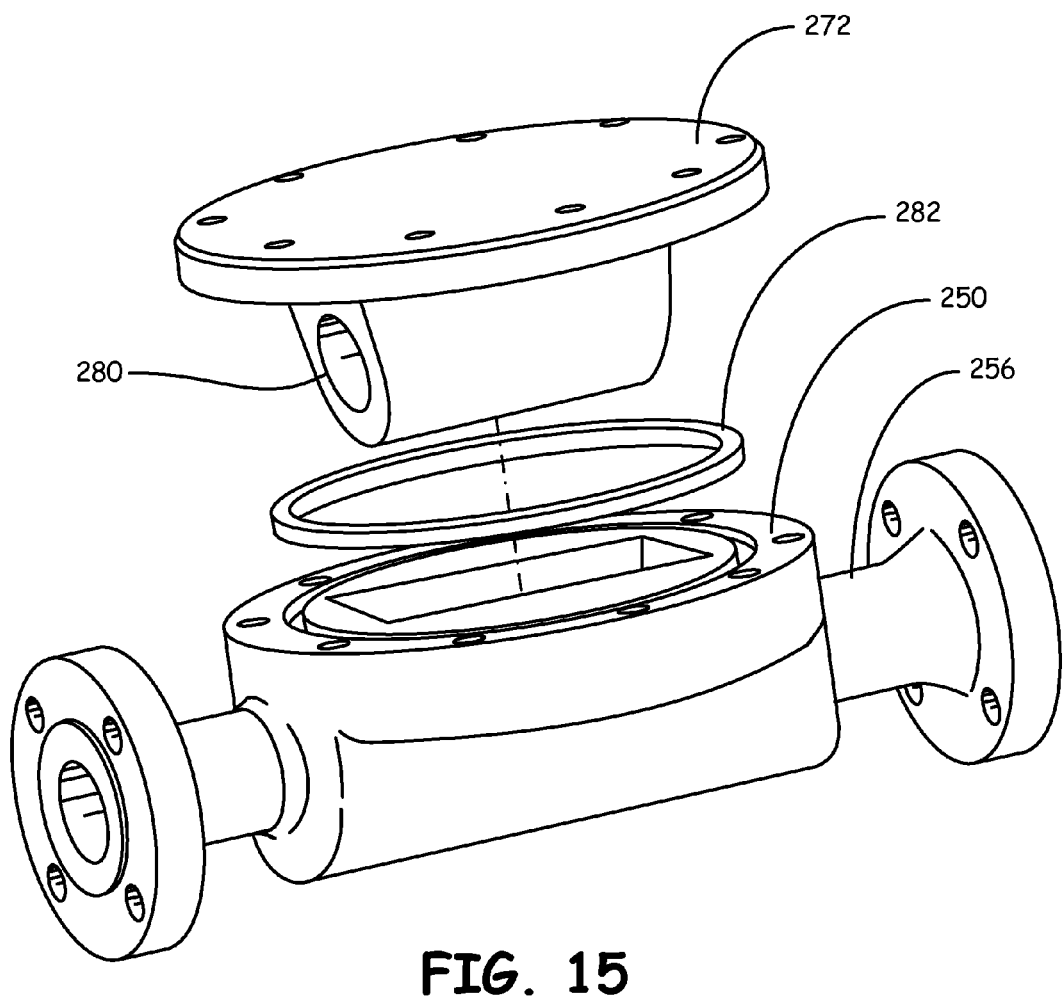
FIG. 15 shows a carrier without any process variable measurement device configured to plug a meter body.

FIG. 15 is an exploded view showing a carrier 272 configured as a plug in which flow tube 280 does not carry any flow measurement component. As described above, such a configuration allows a process variable transmitter to be removed from service and the process piping easily sealed. Similarly, a meter body 250 can be placed at a location in the process whereby a process variable transmitter, using a desired technology, may optionally be installed flow measurement after the plant is commissioned or at some other future date.

Although the present invention has been described with reference to preferred embodiments, workers skilled in the art will recognize that changes may be made in form and detail without departing from the spirit and scope of the invention. The present invention provides a universal connection platform for measuring flow using differential pressure or other technologies. Because standardized components and connection arrangements are provided, the memory 214 of the process variable transmitter 116 can contain standardized configuration information for the universal platform. For example, the memory can contain information related to the elongate spool, a particular flow measurement component, as well as other information. This allows installation and set up to be completed more rapidly with less operator interaction, and with a reduced likelihood of error. Further, spare components can be maintained on location whereby damaged components can be easily replaced without needing to obtain specialized or customized replacement parts. The sealing plate or plug illustrated in FIGS. 5A, 5B and 15 can be used during transportation of the meter body and can also be used to pressure test the components once they are installed in an industrial process. Further, the sealing plate or plug can be used with a spool whereby the spool is used at a process location without the presence of any process variable transmitter. This allows the process to be easily updated at a future date should it be desired to add a process variable sensor at that location. The configuration reduces the amount of customization which must be performed on a process variable transmitter when commissioning a device. Further still, the configuration reduces the amount of customization which must be performed when updating or constructing a plant. This allows much greater flexibility for subsequently modifying the process by obtaining a process variable at a particular location, or changing the technology used to obtain a process variable. Further, this configuration allows different flow sensing techniques to be easily exchanged even after the device has been installed in a process. For example, if a process is changed whereby a different flow sensing technology may be preferable, an operator can simply replace the installed flow measurement component with a different technology carrier as desired. The present invention is not limited to the illustrated technologies components and may also be used in other configurations. In such configurations, a pressure carrying conduit may not be required to extend from the process fluid, through the carrier to the process variable transmitter. Example flow measurement components include venturi, wedge, nozzle, small inline flow measurement components (for a high velocity flow), as well as other technologies including a magnetic flowtube, a vortex shedding bar, a coriolis based flowtube, a thermal mass sensor, an ultrasonic based sensor, etc. If the spool conduit has a known shape, appropriate compensation can be performed in the process variable transmitter. One preferred shape is the straight configuration illustrated herein as this provides a more uniformed flow profile through the conduit. However, the invention is not limited to this configuration. As used herein, the "elongate spool" includes spool configurations which are not straight and may include one or more curve, bend, or other configuration.

What is claimed is:

1. An apparatus for measuring flow of a process fluid, comprising:
   an elongate spool providing a spool conduit therethrough adapted to be coupled in line with process piping to receive the flow of process fluid;
   a meter body carried by the elongate spool receiving the spool conduit therethrough, the meter body including a flow measurement component opening which extends from the spool conduit to outside of the meter body;
   a flow component configured for placement in the flow measurement component opening of the meter body;
   a carrier configured to removably mount to the meter body and couple the flow measurement component to the spool conduit through the flow measurement component opening; and
   a flow measurement transmitter coupled to the flow measurement component configured to measure the flow of process fluid based upon an interaction between the process fluid and the flow measurement component.

2. The apparatus of claim 1, wherein the flow measurement component comprises a magnetic flow tube.

3. The apparatus of claim 1, wherein the flow measurement component comprises a vortex shedding bar.

4. The apparatus of claim 1, wherein the flow measurement component comprises a venturi tube.

5. The apparatus of claim 1, wherein the flow measurement component comprises a coriolis tube.

6. The apparatus of claim 1, wherein the flow measurement component comprises ultrasonic sensors.

7. The apparatus of claim 1, wherein the flow measurement component comprises a thermal mass sensor.

8. The apparatus of claim 1, wherein the flow measurement component comprises a wedge.

9. The apparatus of claim 1, wherein the flow measurement component comprises an orifice plate.

10. The apparatus of claim 1, wherein the flow measurement component comprises an averaging pitot tube.

11. The apparatus of claim 1, wherein the carrier includes passageways which conduct process fluid from the spool conduit to the transmitter.

12. The apparatus of claim 1, wherein the spool conduit is substantially straight.

13. The apparatus of claim 1, wherein the carrier is configured to fit on the meter body in at most one configuration.

14. The apparatus of claim 1, wherein the spool conduit has first and second ends which include flanges configured to couple to process piping.

15. The apparatus of claim 1, wherein the carrier includes a planar face configured to fluidically couple to a planar face of a transmitter flange connection.

16. The apparatus of claim 1, wherein the meter body is further configured to receive a sealing plate.

17. The apparatus of claim 1, wherein the flow measurement transmitter includes a memory containing configuration information related to the elongate spool.

18. The apparatus of claim 1, wherein the flow measurement transmitter includes a memory containing configuration information related to the flow measurement component.

19. The apparatus of claim 1, wherein the meter body is configured to receive different types of flow measurement components.

20. The apparatus of claim 1, wherein the meter body includes a secondary opening configured to receive a process variable sensor.

21. The apparatus of claim 1, wherein the process variable sensor comprises a temperature sensor.

22. A method for measuring flow of a process fluid through process piping, the method comprising the steps of:
    placing an elongate spool in series with the process piping whereby the process fluid flows through the elongate spool, the elongate spool including a meter body having a flow measurement opening which extends from a spool conduit to outside of the meter body;
    placing a flow measurement component into the spool conduit through the flow measurement component opening, the flow measurement component carried on a carrier;
    measuring a process variable based upon an interaction of the flow measurement component with flow of process fluid; and
    determining flow based upon the measured process variable.

23. The method of claim 22, wherein the flow measurement component comprises a magnetic flow tube.

24. The method of claim 22, wherein the flow measurement component comprises a vortex shedding bar.

25. The method of claim 22, wherein the flow measurement component comprises a venturi tube.

26. The method of claim 22, wherein the flow measurement component comprises a coriolis tube.

27. The method of claim 22, wherein the flow measurement component comprises ultrasonic sensors.

28. The method of claim 22, wherein the flow measurement component comprises a thermal mass sensor.

29. The method of claim 22, wherein the flow measurement component comprises a wedge.

30. The method of claim 22, wherein the flow measurement component comprises an orifice plate.

31. The method of claim 22, wherein the flow measurement component comprises an averaging pitot tube.

32. The method of claim 22, including providing passageways in the carrier which carry process pressure from the spool to a flow measurement pressure transmitter.

33. The method of claim 22, wherein the carrier is configured to fit on the meter body in at most one configuration.

34. The method of claim 22, including sealing the flow measurement component opening with a seal on a carrier plug.

35. The method of claim 22, including storing configuration information related to the elongate spool in a memory.

36. The method of claim 22, including storing containing configuration information related to the flow measurement component in a memory.

37. The method of claim 22, wherein the flow measurement component opening is shaped to receive different types of flow measurement components carried on the carrier.

38. The method of claim 22, including placing a process variable sensor in a secondary opening of the meter body.

* * * * *